UNITED STATES PATENT OFFICE 2,337,498

PRODUCTION OF FERTILIZERS

Friedbert Ritter, Franz Rodis, and Karl Weitendorf, Piesteritz, Germany; vested in the Alien Property Custodian No Drawing. Application June 27, 1939, Serial No. 281,326. In Germany January 16, 1939

2 Claims. (Cl. 71—41)

This invention relates to a process for the production of fertilizers.

For the production of fertilizers containing phosphoric acid compounds in a form easily assimilable by plants, from raw phosphates (rock phosphate), it has, for a long time, been known to decompose the raw phosphates with the aid of sulphuric acid. The so-called "superphosphate" thus obtained consists substantially of a mixture of monocalcium phosphate with an appreciable proportion of calcium sulphate. It is an object of the present invention to produce fertilizers of a similar nature while avoiding the large ballast of calcium sulphate contained in the "superphosphate" hitherto known. A further object of the invention is to increase the proportion of phosphoric acid compounds which is converted into assimilable form, practically the whole of the phosphoric acid content of the final product being present in the form of compounds which are both soluble in citric acid as well as ammonium citrate.

According to the present invention, raw phosphates are mixed with phosphoric acid, preferably of at least about 40% concentration ($H_3PO_4$ in $H_2O$) in a quantity sufficient to convert the whole of the lime contained in the raw phosphate and which is not already combined therein with phosphoric acid (i. e., particularly as is present as calcium fluoride and/or calcium carbonate) into tricalcium phosphate, whereupon the whole mixture is heated to a temperature of at least about 1300° C., and preferably to about 1350° C.

According to a modification of the invention such phosphates as are capable of combining with the whole, or at least the greater part, of the lime other than that already combined with phosphoric acid as tricalcium phosphate, can be used instead of phosphoric acid. When employing an alkali metal phosphate for this purpose, the reaction would proceed e. g. in accordance with the equations:

I. 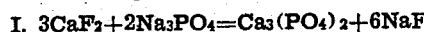
II. 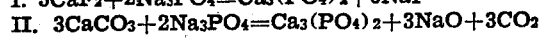

These equations are based on the employment of orthophosphates; however pyrophosphates or metaphosphates may be used instead. In this case it has moreover been observed that the alkali content of the alkali metal phosphate has an effect similar to that of phosphoric acid, so that according to this modification of the invention it is not only possible to replace the phosphoric acid as such by phosphoric acid in a combined form which is cheaper, but also to effect a saving in total amount of phosphoric acid (whether uncombined or combined) as such.

Similarly, when operating with phosphoric acid or with phosphoric acid compounds other than alkali metal phosphates, a further saving in phosphoric acid (both combined or uncombined) can be effected by providing a further addition of alkali, e. g., in the form of soda ash, sodium sulphate, potash, or potassium sulphate. In this respect it has been found advantageous to provide about 0.5 mol of alkali oxide for every mol of $P_2O_5$ contained in the raw phosphate.

When adding alkali to the reaction mixture and particularly when such alkali is added in the form of alkali metal phosphate, it has been observed that decomposition of the raw phosphates already takes place with lower heating temperatures, viz., at least about 1100° C., and preferably about 1250 to 1280° C.

Whilst when using phosphoric acid alone for the decomposition, a high silica content of the raw phosphate is somewhat troublesome, this is not the case when an addition of alkali is made to the reaction mixture; in the latter case a relatively high silica content of the raw phosphate is indeed desirable. The treatment with phosphoric acid alone is however also applicable to raw phosphates rich in silica provided that lime is added to the reaction mixture in such quantities that the silica present is converted thereby into calcium silicates. Frequently however, it is more advantageous to make up a burden in which raw phosphates rich in silica (e. g., Pebble phosphate) are mixed with raw phosphates poor in silica (e. g., Morocco phosphates), since with a medium silica content (i. e., a content not exceeding about 4% $SiO_2$ in the raw phosphates) the decomposition with phosphoric acid alone leads to satisfactory results.

Moreover it is sometimes also advantageous to provide for a special addition of silica (sand) when treating raw phosphates poor in silica with phosphoric acid and alkali since, as has already been stated, the presence of silica promotes the decomposition in the presence of alkali. When the treatment is carried out with phosphoric acid alone, then the silica content of the raw phosphate must be at least about 3% in order to arrive at a product of satisfactory solubility. If the silica content of the phosphate is less, then a corresponding amount of silica must be added to the reaction mixture.

Examples

The finely ground raw phosphate is, after careful admixture of any solid additional ingredients (alkali metal compounds, lime, silica, etc.), moistened with water or phosphoric acid, as the case may be, and granulated by means of a worm conveyor. The granules which preferably have an average diameter of 2–6 mms. are continuously supplied to a rotary furnace in which a temperature of 1400° C. or 1280° C., respectively, is maintained at the end where the flame enters, according to whether phosphoric acid alone, or jointly with alkali, is used for decomposition. The small granules maintain their shape during the heating process, are hard and porous and easily crushed.

1. To 25 kgs. of Pebble phosphate (32% $P_2O_5$, 47.6% CaO) are added 2.3 kgs. $P_2O_5$ in the form of aqueous phosphoric acid (350 g. $P_2O_5$ per litre) and 1.5 kgs. of lime (CaO). The final product contains:

Total $P_2O_5$: 38.28%.
$P_2O_5$ soluble in citric acid:
    36.38% = 95% of the total $P_2O_5$ concentration.
$P_2O_5$ soluble in ammonium citrate solution:
    28.54% = 74.5% of the total $P_2O_5$ concentration.
F: 0.06%.

2. To 50 kgs. Pebble phosphate (32.0% $P_2O_5$, 47.6% CaO) are added 7.50 kgs. of soda and 2.50 kgs. $P_2O_5$ in the form of aqueous phosphoric acid (350 g. $P_2O_5$ per litre). The final product contains:

Total $P_2O_5$: 36.00%.
$P_2O_5$ soluble in citric acid:
    35.80% = 99.4% of the total $P_2O_5$ concentration.
$P_2O_5$ soluble in ammonium citrate solution:
    34.72% = 96.5% of the total $P_2O_5$ concentration.
F: 0.05%.

3. To 25 kgs. of Pebble phosphate (32.0% $P_2O_5$, 47.6% CaO) and 25 kgs. of Morocco phosphate (34.2% $P_2O_5$, 49.64% CaO) are added 8.0 kgs. of soda and 3.0 kgs. $P_2O_5$ in the form of aqueous phosphoric acid. The final product contains:

Total $P_2O_5$: 37.41%.
$P_2O_5$ soluble in citric acid:
    35.98% = 96.2% of the total $P_2O_5$ concentration.
$P_2O_5$ soluble in ammonium citrate solution:
    35.30% = 94.3% of the total $P_2O_5$ concentration.
F: 0.09%.

4. To 25 kgs. of Pebble phosphate (32.0% $P_2O_5$, 47.6% CaO) are added 3.94 kgs. $Na_4P_2O_7.10H_2O$ and 1.60 kgs. of soda. The final product contains:

Total $P_2O_5$: 36.85%.
$P_2O_5$ soluble in citric acid:
    35.40% = 96.0% of the total $P_2O_5$ concentration.
$P_2O_5$ soluble in ammonium citrate solution:
    34.82% = 94.4% of the total $P_2O_5$ concentration.
F: 0.12%.

5. To 25 kgs. of Pebble phosphate (32% $P_2O_5$, 47.6% CaO) are added 2.4 kgs. $CaHPO_4$ and 2.2 kgs. $Ca(H_2PO_4)_2$. The final product contains:

Total $P_2O_5$: 38.35%.
$P_2O_5$ soluble in citric acid:
    36.38% = 95% of the total $P_2O_5$ concentration.
$P_2O_5$ soluble in ammonium citrate solution:
    28.54% = 74.5% of the total $P_2O_5$ concentration.
F: 0.05%.

6. To 25 kgs. Morocco phosphate (34.2% $P_2O_5$, 47.6% CaO) are added 4.1 kgs. soda, 1.25 kgs. $P_2O_5$ in the form of aqueous phosphoric acid and 0.75 kg. $SiO_2$ (sand). The final product contains:

Total $P_2O_5$: 37.79%.
$P_2O_5$ soluble in citric acid:
    37.39% = 99% of the total $P_2O_5$ concentration.
$P_2O_5$ soluble in ammonium citrate solution:
    36.21% = 95.8% of the total $P_2O_5$ concentration.
F: 0.15%.

We claim:

1. A process for the production of a fertilizer, which comprises heating a mixture of raw phosphate, phosphoric acid, and an alkali metal compound of the group consisting of the alkali metal sulphates and carbonates and phosphates, the latter two ingredients being present in such approximate amounts as are jointly just sufficient to convert the lime contained in the raw phosphate not present therein in the form of tricalcium phosphate, into tricalcium phosphate, and the proportion of alkali metal compound being such that the mixture contains about 0.5 mol of alkali for every mol of $P_2O_5$ contained in the raw phosphate, to a temperature of at least about 1100° C.

2. A process for the production of a fertilizer, which comprises heating a mixture of raw phosphate, phosphoric acid, and an alkali metal compound of the group consisting of the alkali metal sulphates and carbonates and phosphates, the latter two ingredients being present in such approximate amounts as are jointly just sufficient to convert the lime contained in the raw phosphate not present therein in the form of tricalcium phosphate, into tricalcium phosphate, and the proportion of alkali metal compound being such that the mixture contains about 0.5 mol of alkali for every mol of $P_2O_5$ contained in the raw phosphate, to a temperature between about 1250 and about 1280° C.

FRIEDBERT RITTER.
FRANZ RODIS.
KARL WEITENDORF.